United States Patent [19]

Heath et al.

[11] 4,173,784
[45] Nov. 6, 1979

[54] INERTIAL SYSTEM HAVING CORRECTION MEANS FOR EFFECTS OF GRAVITATIONAL ANOMALIES

[75] Inventors: William H. Heath, Wayne, N.J.; Jack Richman, Forest Hills, N.Y.

[73] Assignee: The Singer Company, Little Falls, N.J.

[21] Appl. No.: 828,730

[22] Filed: Aug. 29, 1977

[51] Int. Cl.² ............................................. G06G 7/78
[52] U.S. Cl. .................................. 364/453; 244/177; 364/571
[58] Field of Search ............... 364/453, 454, 443, 571; 235/307; 244/165, 175, 177, 3.2

[56] References Cited

U.S. PATENT DOCUMENTS

| 3,545,266 | 12/1970 | Wilson | 364/453 |
|---|---|---|---|
| 3,805,235 | 4/1974 | Foster et al. | 235/307 |
| 3,881,670 | 5/1975 | Doniger | 235/307 |
| 3,960,344 | 6/1976 | Dugan | 244/177 |

Primary Examiner—Felix D. Gruber
Attorney, Agent, or Firm—L. A. Wright; T. W. Kennedy

[57] ABSTRACT

Conventional first and second Schuler tuned inertial platforms, that are physically displaced from each other by a predetermined distance, are employed in an inertial system to reduce navigation errors caused by the uncertainty in the earth's gravitational field. In addition to the two Schuler tuned platforms, a conventional velocity measuring instrument is employed to provide damping to the inertial system. The invention takes advantage of the fact that for a pair of ideal platforms if the relative velocity between them as displaced sensors can be measured with moderate accuracy then performance rivaling that obtainable with a gradiometer aided inertial platform can be achieved.

8 Claims, 8 Drawing Figures

NAVIGATION VELOCITY DEGRADATION AS A FUNCTION OF THE RATIO OF SENSOR NOISE TO GRAVITY DEFLECTION NOISE AT SCHULER FREQUENCY.

EFFECT OF RELATIVE VELOCITY MEASUREMENT ACCURACY ON REDUCTION OF NAVIGATION VELOCITY ERROR

NAVIGATION VELOCITY ERROR DEGRADATION AS A FUNCTION OF GYRO AND ACCELEROMETER RANDOM ERROR

NAVIGATION VELOCITY ERROR DEGRADATION AS A FUNCTION OF GYRO AND ACCELEROMETER WHITE NOISE

OPTIMUM FILTER GAIN CHARACTERISTICS FOR SEVERAL DEGRADATION FACTORS

INERTIAL SYSTEM HAVING CORRECTION MEANS FOR EFFECTS OF GRAVITATIONAL ANOMALIES

The Government has rights in this invention pursuant to Contract No. N00030-76-C-0088 awarded by the Department of the Navy.

STATEMENT OF THE PRIOR ART

1. Levine, S., and Gelb, A., "Geodetic and Geophysical Uncertainties—Fundamental Limitations on Terrestrial Inertial Navigation", AIAA Paper 68-847, Pasadena, California, Aug. 12-14, 1968.
2. Jordan, S., "Effects of Geodetic Uncertainties On a Damped Inertial Navigation System", IEEE Transactions on Aerospace and Electronic Systems, Vol. AES-9, September 1973, pp. 741-752.
3. Chatfield, Bennett, Chen, "Effect of Gravity Model Inaccuracy on Navigation Performance", AIAA Journal, Vol. 13, No. 11, November 1975, pp. 1494-1501.
4. Trageser, M. B., "What Can the Gravity Gradiometer Do For Air Missile Mobility?" Technical Report C-3909, The Charles Stark Draper Laboratory, Cambridge, Massachusetts, Mar. 30, 1973.
5. Leondes, Cornelius T., "Guidance and Control of Aerospace Vehicles", McGraw-Hill Book Company, Inc., 1963.
6. Merriam, C. W. "Automated Design of Control Systems", Gordon and Breach Science Publishers, 1974.
7. Daryanani, Gobind, "Principles of Active Network Synthesis and Design", John Wiley and Sons, 1973.
8. Melsa, James and Schultz, Donald, "Computer Programs For Computational Assistance In The Study Of Linear Control Theory", McGraw-Hill Book Company, Inc. 1970.
9. Under Water Log Equipment Electromagnetic Type for 40 Knot Equipment, Technical Manual Type II, August 1959, Litton Industries, College Park, Md. Navships 0365-2623, (Navships 0365-262-3000).
10. U.S. Pat. No. 2,869,117, Berger, et. al, January 1959.
11. U.S. Pat. No. 2,908,903, Berger, et al, October 1959.

This invention is related to inertial systems. More particularly, this invention relates to a means for reducing gravitation uncertainty errors in velocity-damped inertial navigation systems by the employment of conventional multiple inertial sensors.

BACKGROUND OF THE INVENTION

As the inherent errors in the inertial navigation sensors (e.g., gyros and accelerometers) continue to be reduced, there arises another limitation on the accuracy that an inertial navigation system can achieve. This is the limitation caused by uncertainties in the earth's geopotential (i.e., gravitation field). Some investigators have concluded that the geopotential uncertainties are large enough to cause unbounded errors in even a high-quality unaided inertial navigation system, and to produce excessive errors in a velocity and/or position aided inertial system where precision navigation is required.

In terms of causing navigation errors, the most serious of the gravitational uncertainties is the uncertainty of the direction of the actual gravity vector with respect to the theoretical local vertical (the gravity deflection). The gravity deflection has been modeled by many investigators as a Markov process with an empirically-determined correlation function. To a moving vehicle, it is this random process that causes unacceptably large inertial navigation system errors.

During the past thirty years, the continued development of higher accuracy inertial components (gyros, accelerometers, computers, etc.), has made possible more and more accurate position, velocity and attitude outputs from the inertial systems carried in vehicles, and which use the 84 minute pendulum principle (Schuler tuning), or equivalent. As stated above, for several years now, it has become increasingly apparent that accuracy limits of both unaided, and of certain sets of aided inertial systems, is now limited by anomalies of the gravitational field and not by component inaccuracies.

Because of this anomaly limitation, many millions of dollars have been and are now being spent on attempts to remove this limit. For example, high accuracy satellite gravity surveys, electromagnetic radiation position and velocity fixing by means of ground based and/or air/sea based and/or active satellite systems.

Another proposed method of reducing the navigational errors caused by gravity deflection is to use a gravity gradiometer as a navigation aid. Such a device can be used to feed back real-time approximations of the gravity gradient into the navigation equations and thereby reduce the randomness associated with the gravity deflection.

Many of these approaches offer considerable improvement in accuracy but suffer from complexity, high cost, and vulnerability to intentional or unintentional external disturbances.

The present invention overcomes the aforementioned drawbacks by making use of the effects of the anomalies themselves to solve the problem. Specifically, the present invention makes use of the physical separation of multiple sensors mounted on a vehicle. The data from the multiple systems may be processed to reduce errors caused by the uncertainty in the gravity deflection without the need of any additional instruments.

BRIEF DESCRIPTION OF THE INVENTION

The present invention employs at least at two or more conventional sets of inertial sensors which are separated a predetermined distance from one another. The sensors are attached to and carried in the vehicle which contains an inertial system. The inertial system provides the vehicle with velocity, attitude, ect., information available from the vehicle on which the inertial system is mounted. The sensors can be, for example, but are not limited to, inertial systems and are used to determine the support reaction force at sensor locations in the platform.

Accordingly, it is an object of this invention to provide an inertial system which makes use of the anomalies of the gravitational field of the earth or other celestial bodies on a multiple sensor configuration carried in a vehicle to supply corrections to the inertial system.

It is another object of this invention to provide an inertial system employing multiple sensors wherein information concerning the position, velocity and attitude of the vehicle with respect to the celestial body is determined in the vehicle.

These and other objects, features and advantages of the present invention will become apparent from the following description taken in conjunction with the accompanying drawings wherein.

If one defines a body in space in the neighborhood of a celestial body, each point of which is fixed and rotating with the body, one can define the gravitational field of the body as a vector field which has at each point in this space the vector magnitude and direction of the support reaction force required to keep a mass of unit magnitude fixed to the point in body space.

Anomalies in the gravitational field about the body can be defined in several ways. One such would be: (1) define a theoretical gravitational field assuming the body to consist of a damped, incompressible, homogeneous fluid rotating with body angular rate and with mass equivalent to the mass of the body; and (2) define anomalies to consist of differences between the theoretical gravitational field and the actual gravitational field of the body. Normally, the theoretical gravitational field of the above type would be "smooth". The actual field, however, would depart from the smooth field because of non-homogeneities of mass distribution with the actual body and/or other causes.

The invention uses at least two or more conventional sets of sensors rigidly separated by a predetermined distance and which are attached to and carried in the vehicle which contains an inertial system. The vehicle is provided with position, velocity and attitude information from the inertial system. The sensors can be, for example, but are not limited to, inertial systems and are used to determine the support reaction force at sensor locations in the platform. Knowledge of:

a. the three components (along three prescribed orthogonal axes of the vehicle) of the sensor separation lengths $l_{ij}$, which are measurable;

b. the support reaction force vector at each sensor position as measured by the sensor;

c. a theoretical gravitational field of the body, theoretically determined a priori; and d. the a priori fact that the actual gravitational field of the body differs from the theoretical field by reason of anomalies, is sufficient to allow processing of the outputs of the sensors, and supplying of corrections to the position, velocity and attitude outputs of one or more inertial systems carried in the vehicle. Furthermore, e. a priori knowledge (i.e., from gravitational surveys) of the anomalies along the sensors' paths, provided such anomalies contain recognizable features;

will permit determination of the sensors' positions along the paths and use of the positions to supply corrections to position outputs for example, of one or more inertial systems carried in the platform.

Figure 1:
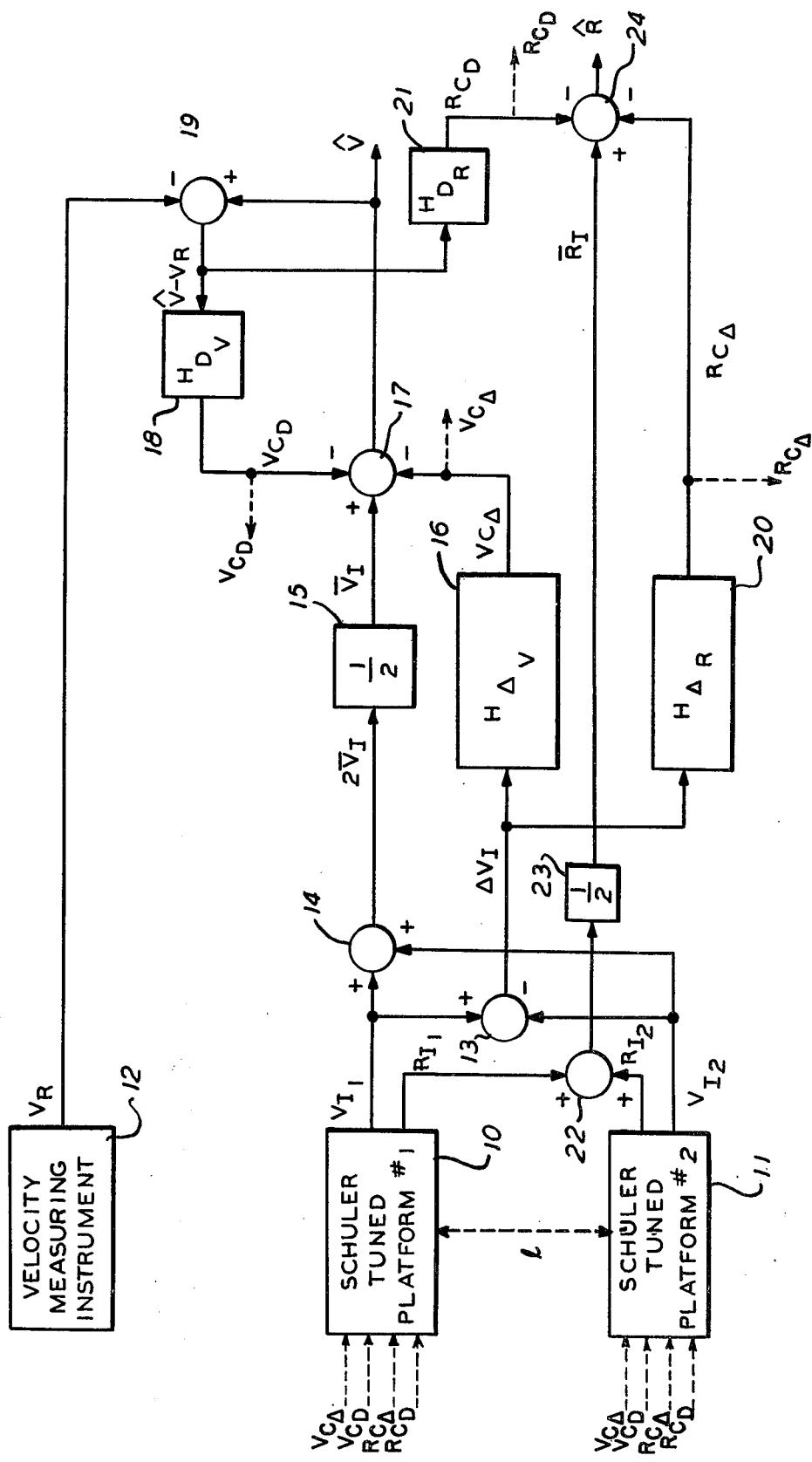
FIG. 1 is a block diagram of a single axis of the anomaly correcting navigation system of the invention.

Referring to the block diagram of FIG. 1, a single horizontal channel of the anomaly correcting inertial navigation system is shown. It is understood that a similar block diagram would show the other horizontal channel (the direction of a channel is defined as being along one of the three prescribed orthogonal axes of the vehicle, two of which are nominally horizontal and one of which is nominally vertical). The system shown in FIG. 1 is comprised of two conventional locally level Schuler tuned inertial platforms 10 and 11 (similar to that described in Chapter 4 of "Guidance and Control of Aerospace Vehicles", Leondes, Cornelius T., McGraw-Hill Book Company, Inc. 1973) separated by a predetermined distance along that channel and an independent measuring instrument 12 (log velocity for a ship, doppler velocity for an aircraft, etc.). Velocity measuring instrument 12 provides damping for the inertial system represented by the damping transfer functions $H_{DV}$ (block 18) and $H_{DR}$ (block 21) between the reference velocity residual $\hat{V}-V_R$ and the average inertial platform velocity $\overline{V}_I$ and average inertial platform position $\overline{R}_I$ respectively. The blocks of FIG. 1 represent conventional circuits and structure known in the prior art. For example, conventional Schuler tuned platforms 10 and 12 are described by Leondes referred to above. Velocity measuring instrument 12 may be a doppler system such as described in U.S. Pat. Nos. 2,869,117 and 2,908,903. Blocks 16, 18, 20 and 21 are circuits consisting of operational amplifiers, resistors and capacitors and are described in "Principles of Active Network Synthesis and Design", Daryanani, Gobind, John Wiley and Sons (1973). As seen from FIG. 1 block 18 may be considered the first velocity correcting circuit since it has corrected the reference velocity residual $\hat{V}-V_R$ and has at its output $V_{CD}$ which is the first corrected velocity signal. Block 21 takes the same $\hat{V}-V_R$ signal and provides at its output $R_{CD}$ which is the first position corrected signal. Similarly block 16 provides a second corrected velocity signal $V_{CA}$ and block 20 provides a second corrected position signal $R_{CA}$. The dotted arrows going off from the outputs of blocks 16, 18, 20 and 22 are there to show that these signals in an alternate embodiment of the invention may be employed as inputs to the Schuler tuned platforms 10 and 11 to torque the platforms back from the error causing signal. A typical range of separation distances between inertial sensors 10 and 11 aboard a seagoing vessel would be 50 feet to 500 feet. The larger the separation distance, the better the performance of the system. This separation between the inertial sensors allows both inertial sensors to experience the same gravitational potential but separated in time. A more detailed analysis of the separation between the two sensors is discussed hereinafter. The inertial system of the present invention is nothing more than a conventional velocity damped inertial system (except perhaps that a conventional system requires a separate velocity measuring instrument for each platform). The novel feature of the present invention, however, is the anomaly correcting loop represented by the "delta" transfer functions $H_{\Delta V}$ (block 16) and $H_{\Delta R}$ (block 20) between the inertial platform velocity residual $\Delta V_I$ (output of summing network 13) and the average inertial platform velocity $V_I$ and average inertial platform position $R_I$ respectively. In addition, the transfer functions $H_{DV}$ (block 18) and $H_{DR}$ (block 21) is somewhat different from the conventional velocity damped system when the anomaly correction loop is included.

As previously indicated, FIG. 1 displays only one of two horizontal channels (an X-channel and a Y-channel) of operation. The two velocity inputs ($\Delta V_1$ and $\hat{V}\text{-}V_R$) to the transfer functions must be along the direction of its particular channel. Similarly, the velocity corrections $V_{CD}$ and $V_{C\Delta}$ and the position corrections $R_{CD}$ and $R_{C\Delta}$ are also along the channel.

Not shown in FIG. 1 are the resolutions of the components of the velocity signals from the Schuler tuned platforms, usually in north and east components, to the two horizontal channels of the vehicle. This is accomplished with signals from the azimuth resolver of each of the platforms. Specifically, for each of the Schuler tuned platforms:

$$\begin{bmatrix} V_x \\ V_y \end{bmatrix} = \begin{bmatrix} \cos\Psi & \sin\Psi \\ -\sin\Psi & \cos\Psi \end{bmatrix} \begin{bmatrix} V_n \\ V_E \end{bmatrix}$$

where $\Psi$ is the signal from the azimuth resolver, $V_n$ and $V_E$ are the velocity signals from the Schuler tuned platforms and $V_x$ and $V_y$ are the velocity signals along the X and Y channels respectively (a single channel of which is denoted by $V_I$ in FIG. 1).

FIG. 1 shows the corrected velocity $\hat{V}$ as the sum of the velocity corrections $V_{CD}$ and $V_{C\Delta}$ to $\overline{V}_I$. The X and Y channel components of the corrected velocity are transformed back to platform coordinates by means of the inverse transformation:

$$\begin{bmatrix} V_N \\ V_E \end{bmatrix} = \begin{bmatrix} \cos\Psi & -\sin\Psi \\ \sin\Psi & \cos\Psi \end{bmatrix} \begin{bmatrix} V_x \\ V_Y \end{bmatrix}$$

The corrected components of position along the X and Y channels are similarly transformed back to platform coordinates.

The transfer functions $H_{DV}$, $H_{DR}$, $H_{\Delta V}$ and $H_{\Delta R}$ are obtained by using well-known methods to solve the steady state Kalman filtering equation of a suitable model for the above navigational process (which must also include a stochastic model of the gravitational anomaly). For these equations, see section 4.9 "Automated Design of Control Systems" Merriam, C. W., Gordon and Breach Science Publishers, 1974) and Melsa, James and Schultz, Donald "Computer Programs For Computational Assistance In The Study Of Linear Control Theory", McGraw-Hill Book Company, Inc. 1970. The process is of the form $$\dot{x} = Ax + Gu \tag{O1}$$

$$y = Mx + v$$

and the transfer functions $H_{DV}$, $H_{DR}$, $H_{\Delta V}$ and $H_{\Delta R}$ are obtained from the appropriate row of the matrix $$H = (sI - \hat{A})^{-1}K \tag{O2}$$

where
$\hat{A} = A - KM =$ closed loop process dynamics
$A =$ open loop process dynamics
$x =$ state vector of process
$y =$ measurement vector
$M =$ measurement matrix
$G =$ process noise sensitivity matrix
$K = PM'R^{-1} =$ Kalman filter gain matrix
$R = \text{cov}(v) =$ measurement covariance matrix
$P = \text{cov}(x) =$ state covariance matrix obtained from the solution of the steady state matrix Riccati equation $$0 = AP + PA' + GQG' - PM'R^{-1}MP$$

$Q = \text{cov}(u) =$ process noise covariance matrix.

The specific set of dynamic equations used to design the transfer functions are described hereinafter following a discussion on the development of a suitable model to represent the navigation process.

FIG. 1 shows the position and velocity correction signals being summed to the average platform position and velocity signals respectively. It should be noted that an alternate closed loop feedback mechanization (shown by dotted line) inputs to Schuler tuned platform 10 and 11 involves torquer correction signals to the platforms as well as discrete navigational updates.

The following is a discussion of the gravitational uncertainty models. To facilitate the analysis, this discussion is restricted to a one-dimensional version of the general problem. It is the uncertainty of the gravitational acceleration in the direction of motion that is of concern. This uncertainty is denoted by $\delta g_x = \xi =$ (true value of $g_x$) − (best available estimate of $g_x$)

A variety of models for the uncertainty in the geopotential have been proposed in the literature. The simplest model is that of a first-order Markov process having a correlation function of the form $\rho(y) = \sigma_\xi^2 e^{-y/d}$, but this model is not satisfactory because it requires the assumption that the gravity gradient contains white noise which is somewhat unrealistic.

A more satisfactory model for $\xi$ is a second-order Markov process, which satisfies the differential equation $$\xi'' + c_1\xi' + c_2\xi = u \tag{1}$$

where u is white noise, and
$\xi' = d\xi/dx =$ gravity gradient in direction of motion.
For this investigation, it was found convenient to assume that (1) is critically damped, i.e., $c_1 = 2\lambda$
$c_2 = \lambda^2$ In this case, the correlation function of the gravity deflection is readily shown to be $$\rho_\xi(y) = E\{\xi(x)\xi(x+y)\} = \sigma_\xi^2(1 + y/d)e^{-(y/d)} \tag{2}$$

$\sigma_\xi =$ rms value of gravitational uncertainty
$d = 1/\lambda =$ "characteristic distance"

The spectral density q of the white noise u is adjusted to make $\sigma_\xi$ consistent with empirical data, using the readily established formula:

$$q = 4\lambda^3 \sigma_\xi^2$$

Another easily established relation is that for the rms value of the gravity gradient $\xi'$:

$$\sigma_{\xi'} = \lambda\sigma_\xi = \sqrt{q/4\lambda}$$

Assuming a constant vehicle speed v the differential equation (1) with distance x as the independent variable can be written as in the more customary form with time as the independent variable and with white noise w as the driving input:

$$\dot{\xi}' = -\lambda_1 \xi' - \lambda_2 \xi + w$$

$$\dot{\xi} = v\xi' \quad (3)$$

where the dot denotes differentiation with respect to time and, for the critically-damped process:

$$\lambda_1 = 2v\sigma_{\xi'}/\sigma_\xi$$

$$\lambda_2 = v\sigma_{\xi'}^2/\sigma_\xi^2$$

and where the spectral density of the white noise w is $$\bar{q} = 4v\sigma_{\xi'}^3/\sigma_\xi$$

Figure 2A:
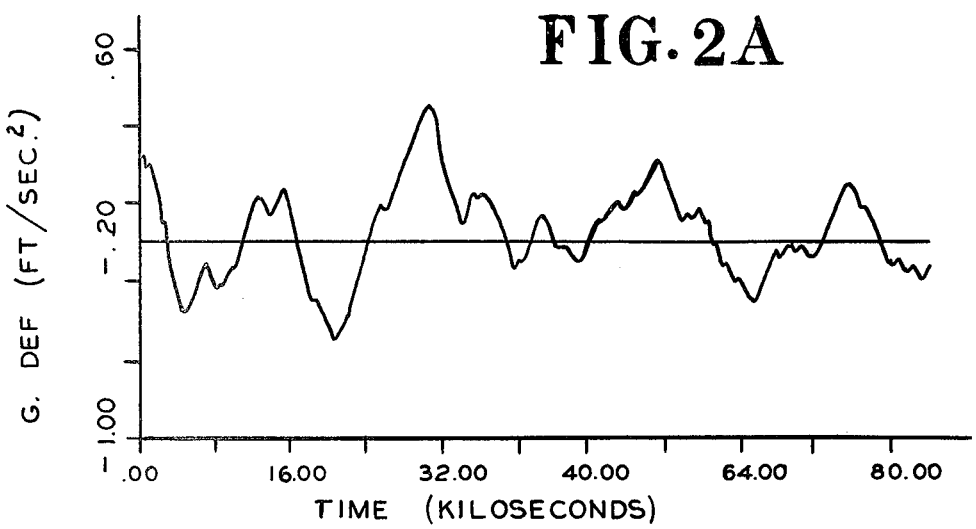
FIG. 2A is a graph showing typical gravity deflection uncertainty for a vehicle traveling at four knots for 24 hours.
Figure 2B:
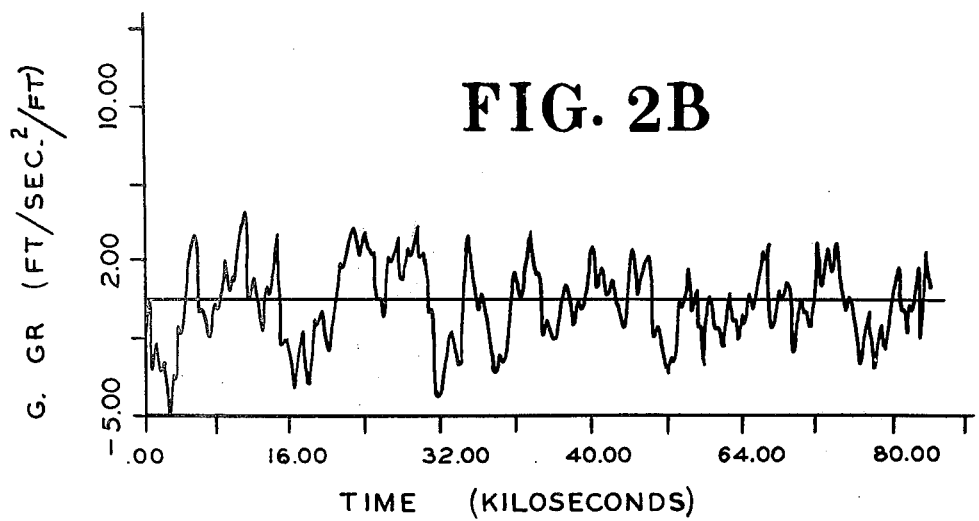
FIG. 2B is a graph showing typical gravity gradient uncertainty for a vehicle traveling at four knots for 24 hours.

A typical computer-simulated deflection and gradient profile, using the model of (3) is shown in FIGS. 2a and 2b for a vehicle traveling at four knots for twenty-four hours. The values of the parameters $\sigma_\xi$ and $\sigma_{\xi'}$ used herein are $\sigma_\xi = 10\ \mu g$ and $\sigma_{\xi'} = 3.8\ \mu g/nm$. These correspond to correlation distances in the gravity deflection and gravity gradient model of 5.6 nm and 1.1 nm respectively.

The following discussion relates to the dynamics of a velocity damped inertial platform subjected to gravity deflection errors. The error equations along a single channel of a single, ideal (error-free) platform subject to gravity deflection error are:

$$\Delta \dot{V} = g\Delta\theta + \xi$$

$$\Delta \dot{\theta} = -\Delta V/R \quad (4)$$

where $\Delta V$ is the system velocity error, $\Delta\theta$ is the platform tilt error, R is the earth's radius, and $\xi$ is the gravitational deflection uncertainty. For the undamped system (4) it can be shown that the randomness associated with the gravity deflection (3) will produce unbounded velocity and tilt errors. Aiding the inertial platform with independent velocity measurements has the effect of providing damping and prevents unbounded navigation errors. For this study, this velocity measurement is assumed to be corrupted by a "low frequency" error $E_v$ (which may be attributed to the instrument and/or environmental conditions) plus white noise $\eta_v$ associated with the instrument. For analysis, the velocity measurement is expressed by:

$$y_v = \Delta V + E_v + \eta_v \quad (5)$$

where the dynamics of $\Delta V$ are given by (4). The low-frequency error $E_v$ is assumed to be the output of a first-order Markov process driven by white noise:

$$\dot{E}_v = -(1/T_v)E_v + w \quad (6)$$

where $T_v$ is the time constant associated with the process and w is the white noise input to the process. The spectral density of w is adjusted to give the desired rms value of $E_v$.

Error propagation is described by equations (3)-(6). The actual error will depend upon the manner in which the platform and velocity data are combined. Since optimum performance is sought, it is assumed that data from all sources is combined optimally—by the use of a Kalman filter.

For this purpose, the independent velocity measurements are the ship's log velocity, with the ocean currents being the primary contributor to the low-frequency error term $E_v$. To establish a single "base-line" navigational accuracy for use as a comparison in evaluating the benefits of a multiple system configuration, the parameters of the low-frequency error in all cases were as follows:

$T_v = 2.5$ hr $(E_v)$ rms $= 1.0$ kt.

The spectral density of the white measurement random noise $\eta_v$ was taken to be $10^{-3}$ kt$^2$hr (Smaller values had no effect in improving the navigational accuracy.).

Optimally combining (3)-(6) by means of a Kalman filter resulted in a steady state navigational error of 0.15 kts.

The discussion which follows concerns navigation with multiple platforms. Consider a pair of platforms, each of which has errors propagating in accordance with (4) and separated by a distance l. Then $$\Delta \dot{V}_1 = g\Delta\theta_1 + \xi(x)$$

$$\Delta \dot{\theta}_1 = -\Delta V_1/R \quad (7a)$$

and $$\Delta \dot{V}_2 = g\Delta\theta_2 + \xi(x+l)$$

$$\Delta \dot{\theta}_2 = -\Delta V_2/R \quad (7b)$$

Let $\delta V = \Delta V_2 - \Delta V_1 =$ relative velocity error $\delta\theta = \Delta\theta_2 - \Delta\theta_1 =$ relative tilt error Then $$\delta \dot{V} = g\delta\theta + \xi(x+l) - \xi(x)$$

$$\delta \dot{\theta} = -\delta V/R \quad (8)$$

For platforms on the same vehicle l is small enough to permit the approximation $$\xi(x+l) - \xi(x) = \xi'(x)l$$

Using the approximation in (8) and combining with either (7a) or (7b) gives the following error equations for the multiple-platform system:

$$\Delta \dot{V} = g\Delta\theta + \xi$$

$$\Delta \dot{\theta} = -\Delta V/R$$

$$\delta \dot{V} = g\delta\theta + \xi'l$$

$$\delta \dot{\theta} = -\delta V/R \quad (9)$$

where $\Delta V$ and $\Delta\theta$ are the platform velocity and tilt errors of one of the platforms.

It is assumed that the relative velocity between the two platforms can be measured by some method which may be subject to noise. The output of the sensor is given by $$y_{\delta v} = \delta V + \eta_{\delta v} \quad (10)$$

Figure 3:
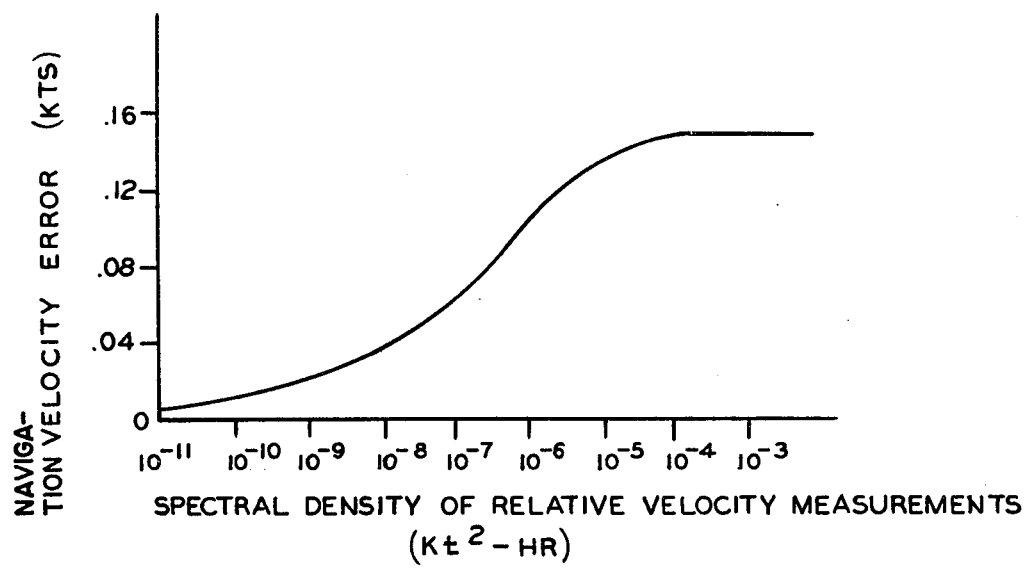
FIG. 3 is a graph showing the effect of relative velocity measurement accuracy on reduction of navigation velocity error.

Equations (3) and (9) together with the log velocity (5) and relative platform velocity measurements (10)

constitute the multiple platform error equations. The steady-state velocity error for a two-platform system with optimal (Kalman filter) data processing is shown in FIG. 3 as a function of the spectral density of the relative velocity measurement noise. As expected, the navigational performance improves as the relative platform velocity measurement noise levels decrease. For a relative velocity measurement accuracy having a spectral density of $10^{-8}$ kt$^2$—hr ($\approx 10^{-4}$ (ft/sec)$^2$ sec and being approximately equivalent to a rms error of 0.01 ft/sec for measurements having a 1 second correlation time) the steady state (1$\sigma$) navigational error decreases from 0.15 kt to 0.037 kt.

The increased navigational accuracy is achieved without a significant reduction in the uncertainty of the gravity gradient or gravity deflection. This is a remarkable result, because the gravity deflection uncertainty is the only source of error in an otherwise ideal inertial platform. Thus, the filter appears to correlate the output between the two platforms in such a manner as to estimate the error caused by the gravity deflection uncertainty without estimating the gravity deflection itself. A possible explanation of this is that the velocity and tilt errors of an unaided inertial platform are convolution integrals of the gravity deflection with $\cos \Omega t$ and $\sin \Omega t$ respectively, i.e., $$\Delta V = \int_0^t \cos \Omega(t - \tau) \xi(\tau) d\tau$$

$$\Delta \theta = -\frac{1}{R\Omega} \int_0^t \sin \Omega(t - \tau) \xi(\tau) d\tau$$

where
$\Omega = \sqrt{g/R}$ = Schuler frequency
and the filter is capable of separately estimating the functions $$\frac{\Omega l}{v} \int_0^t \sin\Omega(t - \tau)\xi(\tau)d\tau$$

and $$\frac{l}{Rv} \int_0^t \cos\Omega(t - \tau)\xi(\tau)d\tau$$

without providing estimates of $\xi(t)$ itself.

The analysis thus far has been restricted to platforms without inertial component errors, which would have to be reckoned with in any realistic application of this method. The effects of accelerometer and gyro errors have been studied. Assuming each platform has independent accelerometer and gyro errors consisting of a constant bias plus a random (first-order Markov process) component, the error equations for the multiple-platform system (9) become $$\Delta \dot{V} = g\Delta\theta + \xi + B_0 + B_1$$

$$\Delta \dot{\theta} = -\Delta V/R + D_0 + D_1$$

$$\delta \dot{V} = g\delta\theta + \xi' l + \delta B_0 + B_1$$

$$\delta \dot{\theta} = -\delta V/R + \delta D_0 + \delta D_1 \tag{11}$$

where $B_0$ and $D_0$ are the constant bias errors associated with the accelerometer and gyro of one of the platforms and $\delta B_0$ and $\delta D_0$ are the bias errors of the second platform relative to the first, i.e., the relative bias. Similarly, $B_1$ and $D_1$ represent the random accelerometer and gyro error of one of the platforms while $\delta B_1$ and $\delta D_1$ correspond to their relative random errors.

The random component errors are assumed to result from first-order Markov processes having the form $$\dot{B}_1 = -1/\tau_B B_1 + u_B$$

$$\dot{D}_1 = -1/\tau_D D_1 + u_D \tag{12}$$

where $\tau_B$ and $\tau_D$ are the time constants associated with the process and $u_B$ and $u_D$ are components of white noise.

If the random errors are to be characterized by constant rms noise values the spectral densities of the white noise $u_B$ and $u_D$ are given by $$g_B = 2/\tau_B \sigma_B^2$$

$$q_D = 2/\tau_D \sigma_D^2$$

where $\sigma_B$ and $\sigma_D$ are the rms noise values associated with the random accelerometer and gyro errors respectively.

Steady state performance calculations were repeated for various levels of accelerometer and gyro errors. The results showed that accelerometer and gyro bias errors do not cause perceptible deterioration in performance because the Kalman filter which processes the measurement data is capable of very quickly estimating the relative bias errors to fairly low levels independent of their initial error values.

Random errors ($B_1$, $D_1$, etc.), however, have a much more deleterious effect even when the noise model is incorporated into the filter. The degradation in performance due to the relative gyro and accelerometer random errors is a function not only of the rms noise level but also the time constant ($\tau_B$, $\tau_D$, etc.). The greater the time constant, the larger the rms noise level required to produce the same degradation of performance. (In fact, as the time constant approaches infinity, the random error approaches a constant bias error which was found to produce no noticeable degradation of performance regardless of the initial uncertainty.) The performance degradation was computed as the ratio of the increase in velocity error from the ideal multiple platform configuration to the increase in error for it to behave as a single velocity damped platform, i.e., Degradation Factor =
$$\frac{\sigma_v(\text{2-Non Ideal Platforms}) - \sigma_v(\text{2-Ideal Platforms})}{\sigma_v(\text{1-Ideal Platform}) - \sigma_v(\text{2-Ideal Platforms})}$$

Thus a "degradation factor" of unity corresponds to no improvement over that of a single, (optimal) velocity-damped platform, while a degradation factor of zero corresponds to no loss in the performance over that of that ideal two-platform system, as shown in FIG. 3.

Figure 4:
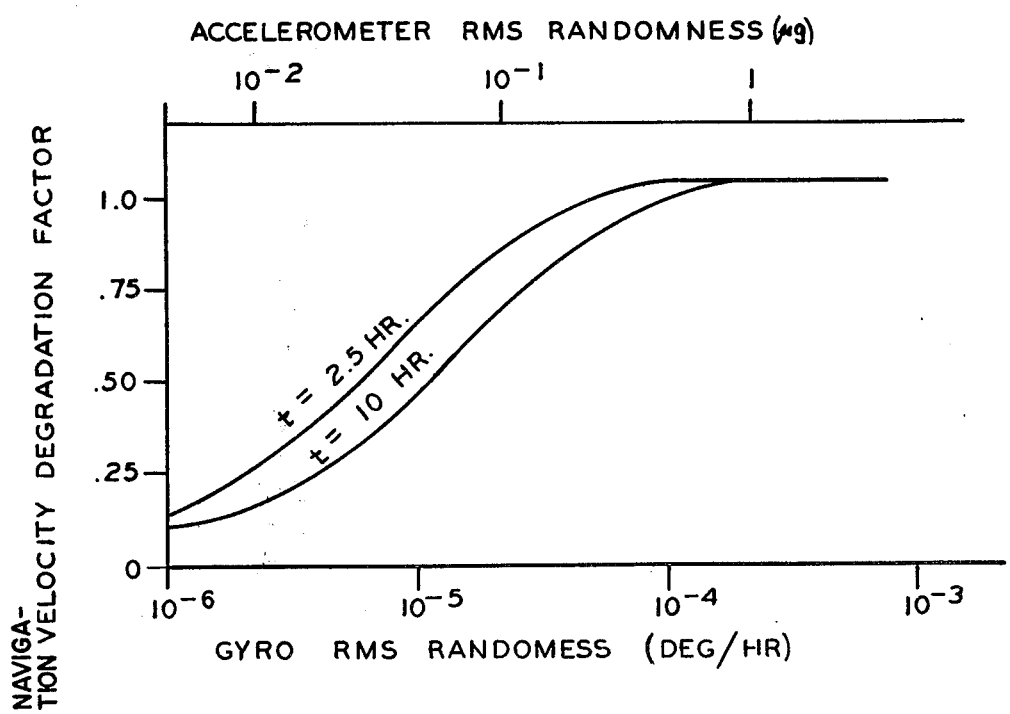
FIG. 4 is a graph showing navigation velocity error degradation as a function of gyro and accelerometer random error.

FIG. 4 shows the degradation in performance due to various gyro and accelerometer rms noise levels having time constants of 2.5 hrs and 10.0 hrs. Achieving a 50% improvement in performance over a single velocity-damped platform (degradation factor of 0.5) would require gyros and accelerometers having noise time constants of 2.5 hrs to have rms noise levels less than $0.6 \times 10^{-5}$ deg/hr and 0.03 $\mu$g, respectively; gyros and accelerometers having noise time constants of 10 hrs could have rms noise levels of $0.1 \times 10^{-4}$ deg/hr and 0.06 μg, respectively.

Figure 5:
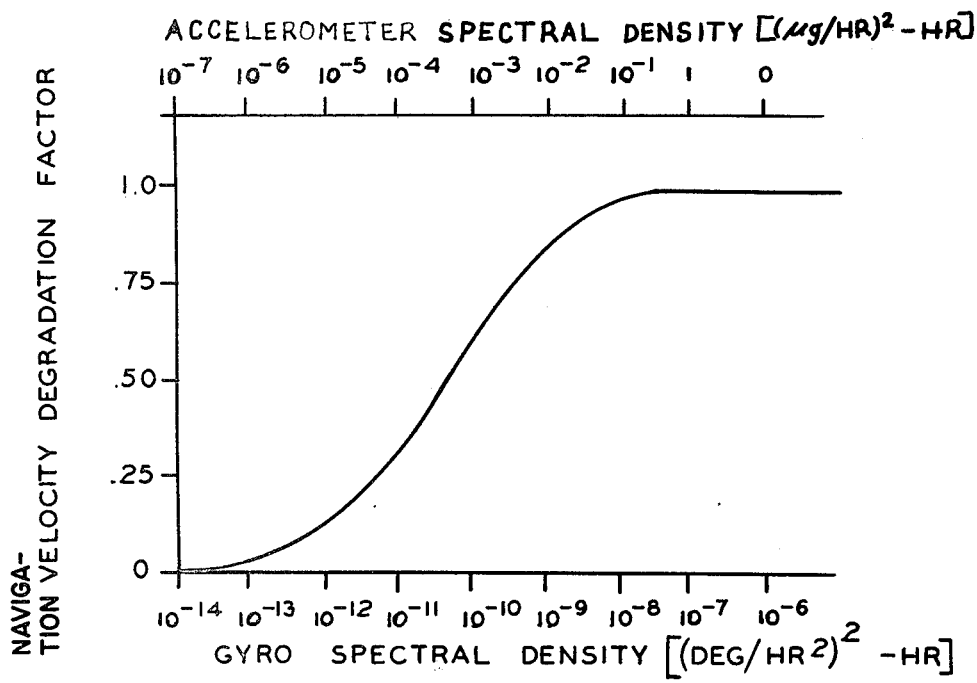
FIG. 5 is a graph showing navigation velocity error as a function of gyro and accelerometer white noise.

In addition to the stationary models of the instrument error given by (12), random walk models $\dot{B} = u_B$
$\dot{D} = u_D$ were also considered. Since these processes are not stationary, they are characterized by the spectral density of the exciting noise ($u_B$ or $u_D$) instead of their rms values. Performance degradation due to various levels of exciting noise is shown in FIG. 5. A 50% improvement would require gyro and accelerometer noise levels to have spectral densities less than $10^{-10}$ (deg/hr$^2$)—hr and $10^{-3}$ (μg/hr$^2$)—hr, respectively.

The feasibility of incorporating an additional measurement, namely, the relative tilt δθ between the two platforms was also considered. The results of a steady state analysis indicated that extremely accurate measurements (to within 0.001 sec) are required to produce any appreciable reduction in the navigational errors shown in FIGS. 4 and 5. Angle measurements of this high accuracy, however, were found to significantly reduce the uncertainty in the gravity deflection as well. Since the relation between the gravity deflection and the measurements is through the gravity model discussed above, it would be reasonable to suspect that achievement of significant performance improvement by use of extremely accurate relative angle measurements depends critically on an accurate gravitational uncertainty model. Since it is not realistic to believe that such a model would be available, it is not reasonable to expect a significant improvement of performance even if extremely accurate relative angle measurements could be made. In contrast, use of only relative velocity measurements can significantly improve navigational accuracy without having to be accurate enough to reduce the gravity deflection uncertainty. From this, one could reasonable infer that an accurate gravitational uncertainty model is not required when only relative velocity measurements are used.

Under ideal conditions, the multiple platforms, by virtue of their separation, are capable of correlating the difference δV in the sensor velocity outputs to the navigation error ΔV caused by gravity deflection uncertainties. The presence of inertial component random errors, however, severely reduces this correlation.

Analytical evidence shows that (for unaided inertial platforms) the correlation between δV and ΔV is tuned at the Schuler frequency. Thus, any source of error causing a reduction in this correlation should be evidenced by properties of the error sources in the vicinity of the Schuler frequency. This is demonstrated in FIG. 6 in which the transfer function between $\hat{V}$ the system optimum velocity estimate, and the measurement δV for four levels of inertial component error (corresponding to the system degradation factors of 0, 0.50, 0.85, and 1.0) are plotted. The curve of zero degradation (no component errors) has a smooth decreasing gain characteristic. The presence of component random errors leads to the appearance of a "notch" at the Schuler frequency, the depth of which increases with increasing sensor noise. This would imply that the filter will tend to attenuate relative velocity measurement data in the neighborhood of the Schuler frequency. Since the correlation between δV and ΔV is tuned at the Schuler frequency, the presence of random noise in the neighborhood of the Schuler frequency tends to reduce this correlation and thereby degrades system performance.

These considerations suggest that the rms value of the inertial component noise, per se, is not the critical parameter in determining the effect on the multiple system performance, but rather its spectral content in the vicinity of the Schuler frequency. For example, a sensor with a large rms error but with little energy near the Schuler frequency would be preferable to one with a lower rms error but with more energy in the vicinity of the Schuler frequency.

The sensor relative velocity output is affected by three independent white noise sources $u_\xi$, $u_{\delta B}$, and $u_{\delta I}$ corresponding to gravity deflection, relative accelerometer and relative gyro noise excitations. The relationship between δV and the noise inputs can be expressed as $$\delta V(\omega) = G_1(\omega) u_\xi(\omega) + G_2(\omega) u_{\delta B}(\omega) + G_3(\omega) u_{\delta D}(\omega)$$

where $G_1$, $G_2$ and $G_3$ are the transfer functions between δV and each input. Since the noise sources are independent, the spectral densities are additive, i.e., $$S_{\delta V}(\omega) = |G_1(\omega)|^2 S_\xi(\omega) + |G_2(\omega)|^2 S_{\delta B}(\omega) + |G_2(-\omega)|^2 S_{\delta D}(\omega) \text{ or}$$

$$S_{\delta V}(\omega) = S_{\delta V/\xi}(\omega) + S_{\delta V/\delta B}(\omega) + S_{\delta V/\delta D}(\omega) \quad (13)$$

Figure 6:
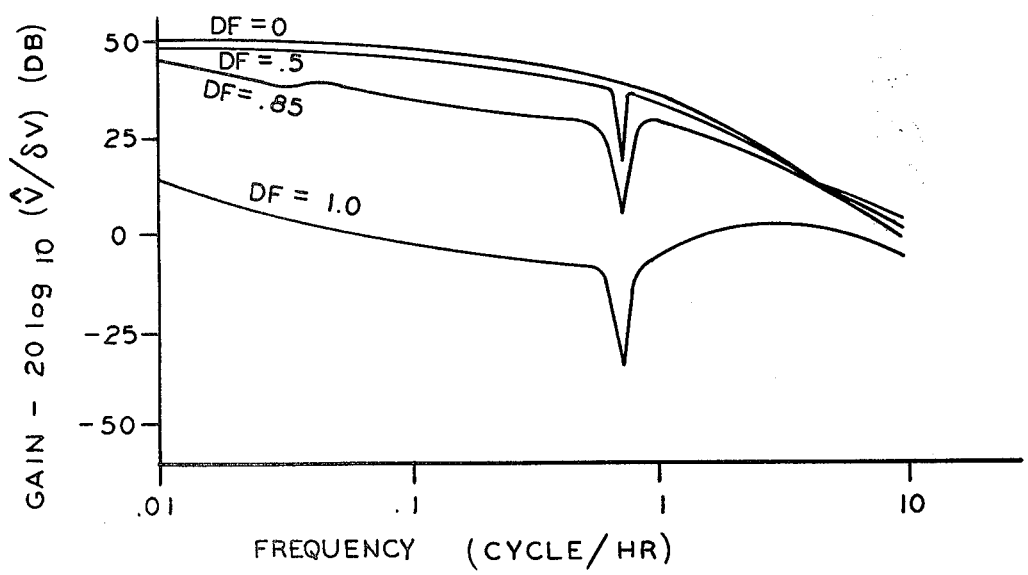
FIG. 6 is a graph showing optimum filter gain characteristics for several degradation factors.

The gain characteristics of FIG. 6 each correspond to different accelerometer noise levels. The gain characteristics of the transfer function for gyro error inputs exhibit similar values in the vicinity of the Schuler frequency. In fact, for any single value of degradation in performance due to either gyro or accelerometer error (FIGS. 4 and 5) the ratio of the spectral densities $S_{\delta V/\delta B}(\omega)$ to $S_{\delta V/\delta D}(\omega)$ is approximately unity at the Schuler frequency. Thus, the level of degradation can be measured as a function of the spectral density of δV at the Schuler frequency independent of its source and (13) can be rewritten as $$S_{\delta V}(\omega) = S_{\delta V/sensor}(\omega) + S_{\delta V/\xi}(\omega) \quad (14)$$

Figure 7:
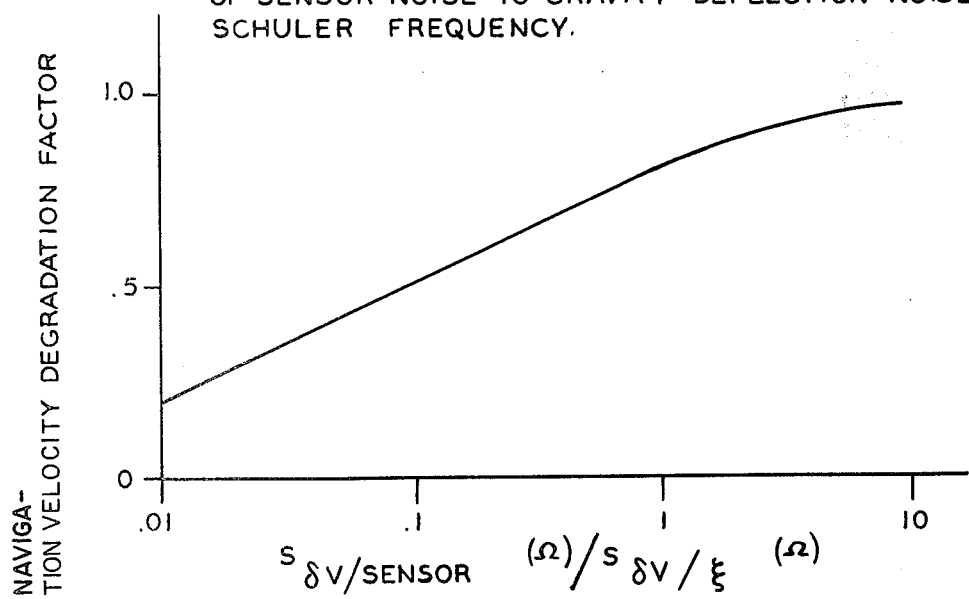
FIG. 7 is a graph showing navigation velocity degradation as a function of the ratio of sensor noise to gravity deflection noise at Schuler frequency.

The curves of FIGS. 4 and 5 have been replotted on FIG. 7 and show the system performance as a function of the ratio of the spectral densities $S_{\delta V/sensor}(\omega)$ to $S_{\delta V/\xi}(\omega)$ at the Schuler frequency, Ω. Attainment of degradation factor of 0.5 requires the sensor noise spectral density at the Schuler frequency to be no more than one tenth the gravity deflection spectral density at the Schuler frequency. Equal spectral densities result in a degradation factor of 0.8 and one in which the sensor noise is ten times the gravity deflection noise results in a degradation factor of 0.98.

The transfer functions $H_{DV}$, $H_{DR}$, $H_{\Delta V}$ and $H_{\Delta R}$ shown in the anomaly correcting system of FIG. 1 are designed by solving the steady state Kalman filtering equations of a suitable model for the navigational process which has the general form shown by equation (01). In view of the above discussion concerning the navigational process, a suitable model (along each of the two horizontal channels) can be represented by a 9 component state vector. Specifically, along one channel the state vector is defined by:

$X_1 = \Delta V$ = error in average of the platform's indicated velocity.
$X_2 = \Delta \theta$ = average tilt error of the platforms.

$X_3 = \delta V$ = difference in velocity output between the two platforms.

$X_4 = \delta\theta$ = difference in tilt between two platforms.

$X_5 = \xi'$ = error in knowledge of gravity gradient.

$X_6 = \xi$ = error in knowledge of gravity deflection.

$X_7 = E_V$ = low frequency error in the dependent measuring instrument.

$X_8 = \delta B_1$ = accelerometer random error relative to the two platforms.

$X_9 = \delta D_1$ = gyro random error relative to the two platforms.

The measurement vector along a single channel can be represented by the following two measurements:

$y_1 \triangleq V_R - \bar{V}_I = E_V + \Delta V$ = difference between the reference velocity signal and the average platform velocity signal.

$y_2 \triangleq V_{I2} - V_{I1} = \delta V$ = difference in velocity signals between the two platforms.

The matrices A,M,G,Q and R defining the process given by equation (01) are:

$$A = \begin{bmatrix} 0 & g & 0 & 0 & 0 & 1 & 0 & 0 & 0 \\ -1/R & 0 & 0 & 0 & 0 & 0 & 0 & 0 & 0 \\ 0 & 0 & 0 & g & 1 & 0 & 0 & 1 & 0 \\ 0 & 0 & -1/R & 0 & 0 & 0 & 0 & 0 & 0 \\ 0 & 0 & 0 & 0 & -\lambda_1 & -\lambda_2 & 0 & 0 & 0 \\ 0 & 0 & 0 & 0 & V & 0 & 0 & 0 & 0 \\ 0 & 0 & 0 & 0 & 0 & 0 & -1/T_v & 0 & 0 \\ 0 & 0 & 0 & 0 & 0 & 0 & 0 & -1/T_{\delta B} & 0 \\ 0 & 0 & 0 & 0 & 0 & 0 & 0 & 0 & -1/T_{\delta D} \end{bmatrix}$$

$$G = \begin{bmatrix} 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 0 & 0 & 0 \\ 0 & 1 & 0 & 0 \\ 0 & 0 & 1 & 0 \\ 0 & 0 & 0 & 1 \end{bmatrix}$$

$$M = \begin{bmatrix} 1 & 0 & 0 & 0 & 0 & 0 & 1 & 0 & 0 \\ 0 & 0 & 1 & 0 & 0 & 0 & 0 & 0 & 0 \end{bmatrix}$$

$$Q = \begin{bmatrix} q_\xi & 0 & 0 & 0 \\ 0 & q_{EV} & 0 & 0 \\ 0 & 0 & q_{\delta B} & 0 \\ 0 & 0 & 0 & q_{\delta D} \end{bmatrix}$$

$$R = \begin{bmatrix} r_v & 0 \\ 0 & r_{\delta v} \end{bmatrix}$$

where l = component of platform separation distance along the channel.

R = Radius of the Earth.

$\lambda_1 \triangleq 2V\sigma_{\xi'}/\sigma_\xi$ } Parameters used in the stochastic
$\lambda_2 \triangleq V\sigma^2_{\xi'}/\sigma_\xi$ } model of the gravity anomaly.

$T_v$ = Time constant associated with the low frequency error $E_v$.

$T_{\delta B}$ = Time constant associated with the accelerometer random error $\delta B_1$.

$T_{\delta D}$ = Time constant associated with the gyro random error $\delta D_1$.

$q_\xi \triangleq 4V\sigma^3_{\xi'}/\sigma_\xi$ $q_{EV} \triangleq 2/T_v\sigma_{EV}^2$ $q_{\delta B} \triangleq 2/T_{\delta B}\sigma_B^2$ $q_{\delta D} \triangleq 2/T_{\delta D}\sigma_{\delta D}^2$ V = Nominal velocity along the channel.

$\sigma_{\xi'}$ = rms value of gravity gradient uncertainty.

$\sigma_\xi$ = rms value of gravity deflection uncertainty.

$\sigma_{EV}$ = rms noise value associated with the low frequency velocity measurement error $E_V$.

$\sigma_{\delta B}$ = rms noise valve associated with the random accelerometer error $B_1$.

$\sigma_{\delta D}$ = rms noise value associated with the random gyro error $D_1$.

$r_v \triangleq \sigma^2_v$ = variance associated with the high frequency error of the independent velocity measurement instrument.

$r_{\delta v} \triangleq \sigma^2_{\sigma v}$ variance associated with the measurement of the difference in velocity signals between the two platforms.

The transfer functions are computed in the following manner:

A prior knowledge of the statistical and physical characteristics enables the matrices A,M,G,Q and R to be numerically evaluated.

Using well-known numerical methods and available computer programs (e.g. Melsa, James and Schultz, Donald, "Computer Programs For Computational Assistance In The Study of Linear Control Theory", McGraw-Hill Book Co., Inc. 1970), the state covariance matrix P is obtained from the numerical solution of the steady state matrix Riccati equation:

$$0 = AP + PA' + GQG' - PM'R^{-1}MP$$

The steady state Kalman filter gain matrix is computed from:

$$K = PM'R^{-1}$$

A matrix of transfer functions are obtained from the numerical evaluation of:

$$H = (sI - \hat{A})^{-1} K$$

where $\hat{A} = A - KM$

H is a 9×2 matrix. The four transfer functions shown in FIG. 1 are:

$H_{DV} \triangleq H_{1,1}$
$H_{DV} \triangleq -RH_{2,1}$
$H_{DV} \triangleq H_{2,1}$
$H_{DV} \triangleq -RH_{2,2}$ It should be noted that digital computer programs are necessary only for design purposes (numerically evaluating the transfer functions in the method outlined above). The numerical methods used by these programs are common knowledge to those people skilled in the techniques of modern control theory noting the references to C. W. Merriam and Melsa and Schultz.

The programs evaluate four ninth order transfer functions along each of the two horizontal channels. Using present state of the art techniques, these transfer functions can be synthesized with active networks (see chapter 7 of "Principles of Active Network Synthesis and Design"). No additional programs are necessary for the operation of the system.

The transfer functions $H_{DV}$, $H_{DR}$, $H_{\Delta V}$ and $H_{\Delta R}$ will each have the formula of an eighth order polynomial divided by a ninth order polynomial as shown below:

$$H = \frac{b_1 s^8 + b_2 s^7 + b_3 s^6 + b_4 s^5 + b_5 s^4 + b_6 s^3 + b_7 s^2 + b_8 s + b_9}{s^9 + a_1 s^8 + a_2 s^7 + a_3 s^6 + a_4 s^5 + a_5 s^4 + a_6 s^3 + a_7 s^2 + a_8 s + a_9}$$

The constant gains $a_1, a_2, \ldots, a_9, b_1, b_2, \ldots, b_9$ will, of course, be different for each of the four transfer functions. These four sets of gains are obtained from the numerical evaluation of the four elements of the transfer function matrix $H = (sI - \hat{A})^{-1} K$ described above.

From the foregoing, an inertial system employing multiple inertial sensors for correcting navigational errors due to gravitational anomalies has been disclosed. While a particular embodiment of the invention has been shown and described, modifications may be made, and it is intended in the following claims to cover the embodiments which fall within the true spirit and scope of the invention.

What is claimed is:

1. An inertial navigation system for correcting the effects of gravitational anomalies comprising:
    a first inertial navigation sensor,
    a second inertial navigation sensor displaced from said first sensor by a predetermined distance,
    means for providing correction signals to the output signals of said first and second inertial navigation sensors by processing the output signals of said first and second inertial sensors whereby said navigation system is corrected for the effects of gravitational errors.

2. The inertial system of claim 1 further comprising:
    a multiplicity of N inertial sensors displaced a predetermined distance from each other, and
    means for providing correction signals to the output signals of each of said sensors by processing the output signals of each of said sensors whereby said navigation system is corrected for the effects of gravitational errors, wherein N is equal to 3 or more.

3. An inertial system for correcting the effects of gravitational anomalies comprising:
    a first Schuler tuned inertial platform,
    a second Schuler tuned inertial platform displaced a predetermined distance from said first inertial platform,
    means for providing an independent measurement of velocity,
    means responsive to said independent velocity measurement for providing damping correction signals to the output of said first and second inertial platforms, and
    means for providing delta correction signals to the output of said first and second inertial platforms.

4. The inertial system of claim 3 wherein the first and second Schuler tuned platform provides output velocity signals and comprises:
    means for comparing the output velocity signals of said first and second Schuler tuned platforms for developing the inertial platform velocity residual signal.

5. The inertial system of claim 4 comprising:
    means for summing said output velocity signals of said first and second Schuler tuned platforms for developing the average inertial platform velocity signal and average inertial platform position signal.

6. The inertial system of claim 5 comprising:
    means for summing said damping and delta correction signals with said average inertial platform velocity signal and said average inertial platform position signal for providing estimated system velocity signal and estimated system position signal.

7. In an inertial navigation system having a first Schuler tuned platform and a second Schuler tuned platform displaced a predetermined distance apart, a plurality of summing, differencing and gain circuits interconnecting the output signals of each Schuler tuned platform, a plurality of identical transfer function circuits comprising summing, differencing and gain circuit and a velocity measuring circuit, the method of correcting for the effects of gravitational anomaly errors comprising:
    separating the first and second Schuler tuned platforms a predetermined distance apart,
    using the summing, differencing and gain circuits to combine the position and velocity output signals of said first Schuler tuned platform with the position and velocity output signals of said second Schuler tuned platform to obtain signals representative of average inertial platform velocity, average inertial platform position and inertial platform residual velocity,
    using summing and differencing circuits of the transfer circuits to combine said average inertial platform position signal with a first and second position correcting signal, and
    using said summing and differencing circuits of said transfer function circuit to combine said average inertial platform velocity signal with a first and second velocity correcting signal to obtain estimated system position and velocity signals corrected for gravitational anomalies.

8. The method of claim 7 comprising:
    feeding back said estimated velocity signal and combining it with a signal from said velocity measuring circuit to provide a reference velocity residual signal as the input signal to the first velocity correcting circuit which provides said first velocity correcting signal, feeding said reference velocity residual signal to a first position correcting circuit to provide said first position correcting signal, feeding forward said platform velocity residual signal to provide the input signal to the second velocity correcting circuit which provides said second velocity correcting signal, and feeding forward said platform velocity residual signal to provide the input signal to the second position correcting circuit which provides said second position correction signal.

* * * * *